(12) United States Patent
Lake

(10) Patent No.: US 11,686,468 B1
(45) Date of Patent: Jun. 27, 2023

(54) BIRTHDAY CANDLE HOLDING ASSEMBLY

(71) Applicant: Desiree Lake, Prince George (CA)

(72) Inventor: Desiree Lake, Prince George (CA)

( * ) Notice: Subject to any disclaimer, the term of this patent is extended or adjusted under 35 U.S.C. 154(b) by 0 days.

(21) Appl. No.: 17/946,121

(22) Filed: Sep. 16, 2022

(51) Int. Cl.
*F21V 35/00* (2006.01)
*A21D 13/47* (2017.01)
*F21W 121/00* (2006.01)
*A47G 19/26* (2006.01)
*A47G 19/30* (2006.01)

(52) U.S. Cl.
CPC .............. *F21V 35/00* (2013.01); *A21D 13/47* (2017.01); *A47G 19/26* (2013.01); *A47G 19/30* (2013.01); *A47G 2400/061* (2013.01); *F21W 2121/002* (2013.01)

(58) Field of Classification Search
CPC .. A47G 19/30; A47G 2400/061; A47G 23/06; A47G 23/068; F21W 2121/002; F21V 35/00; F21V 35/006; F21V 35/003
USPC .................................. 362/382; 431/295, 563
See application file for complete search history.

(56) References Cited

U.S. PATENT DOCUMENTS

| | | | | |
|---|---|---|---|---|
| 1,707,539 A | * | 4/1929 | Propp | G09F 13/00 428/7 |
| 2,960,770 A | * | 11/1960 | Valenta | F21V 35/00 33/525 |
| D713,694 S | | 9/2014 | Fitzpatrick | |
| D737,106 S | | 8/2015 | Goodman | |
| 9,402,490 B2 | | 8/2016 | Johnson | |
| 10,463,180 B1 | | 11/2019 | Donnelly | |
| 11,213,148 B1 | | 1/2022 | Payne | |
| 2006/0078838 A1 | * | 4/2006 | McLemore | A47G 19/00 431/253 |
| 2008/0241775 A1 | | 10/2008 | Poemontese | |
| 2014/0272743 A1 | * | 9/2014 | Hill | F21V 35/00 431/295 |
| 2019/0167021 A1 | * | 6/2019 | Jones | A47G 19/02 |
| 2021/0219757 A1 | | 7/2021 | Griffin, Jr. | |
| 2021/0396383 A1 | * | 12/2021 | Fuge | F21V 35/00 |

FOREIGN PATENT DOCUMENTS

| | | | | |
|---|---|---|---|---|
| FR | 2798274 A1 | * | 3/2001 | ............ A47G 19/26 |
| FR | 3039386 A1 | * | 2/2017 | |
| WO | WO2007026057 | | 3/2007 | |

* cited by examiner

*Primary Examiner* — Laura K Tso

(57) ABSTRACT

A birthday candle holding assembly includes a panel that has a plurality of first wells to insertably receive a birthday candle. Each of the first wells has a circular shape thereby facilitating the first wells to receive cylindrical birthday candles. The panel has a plurality of second wells to receive letter or number birthday candles. A plurality of legs is each pivotally disposed on the panel. Each of the legs is positionable in a deployed position having the legs extending downwardly from the panel thereby facilitating the panel to support the birthday candles over a birthday cake. Each of the legs is positionable in a folded position to facilitate the panel to be positioned in a dishwasher for cleaning the panel.

5 Claims, 4 Drawing Sheets

BIRTHDAY CANDLE HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to birthday candle devices and more particularly pertains to a new birthday candle device for displaying birthday candles over a birthday cake. The device includes a panel with a plurality of first wells for insertably receiving birthday candles and a plurality of second wells for insertably receiving letter or number birthday candles. The device includes a plurality of legs that are pivotally disposed on the panel for supporting the panel above a birthday cake. In this way the birthday candles can be displayed over the birthday cake without requiring the birthday candles to be inserted into the birthday cake.

(2) Description of Related Art Including Information Disclosed Under 37 CFR 1.97 and 1.98

The prior art relates to birthday candle devices including a cake shield that includes a foraminous cover that is positionable over a cake and a lid that is positionable over the foraminous cover. The prior art discloses a birthday cake protector that includes a box that is positionable over a birthday cake and a foraminous platform spaced above the box for insertably receiving birthday candles. The prior art discloses a birthday candle display that comprises a foraminous ring that can insertably receive birthday candles, a plurality of arms quadrisecting the ring and a disk that is positionable on the ring and the arms. The prior art discloses a cake cover that includes wells integrated into top wall of the cake cover for insertably receiving birthday candles. The prior art discloses a variety of ornamental designs of a cake cover that each at least includes a box which has a foraminous top wall.

BRIEF SUMMARY OF THE INVENTION

An embodiment of the disclosure meets the needs presented above by generally comprising a panel that has a plurality of first wells to insertably receive a birthday candle. Each of the first wells has a circular shape thereby facilitating the first wells to receive cylindrical birthday candles. The panel has a plurality of second wells to receive letter or number birthday candles. A plurality of legs is each pivotally disposed on the panel. Each of the legs is positionable in a deployed position having the legs extending downwardly from the panel thereby facilitating the panel to support the birthday candles over a birthday cake. Each of the legs is positionable in a folded position to facilitate the panel to be positioned in a dishwasher for cleaning the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
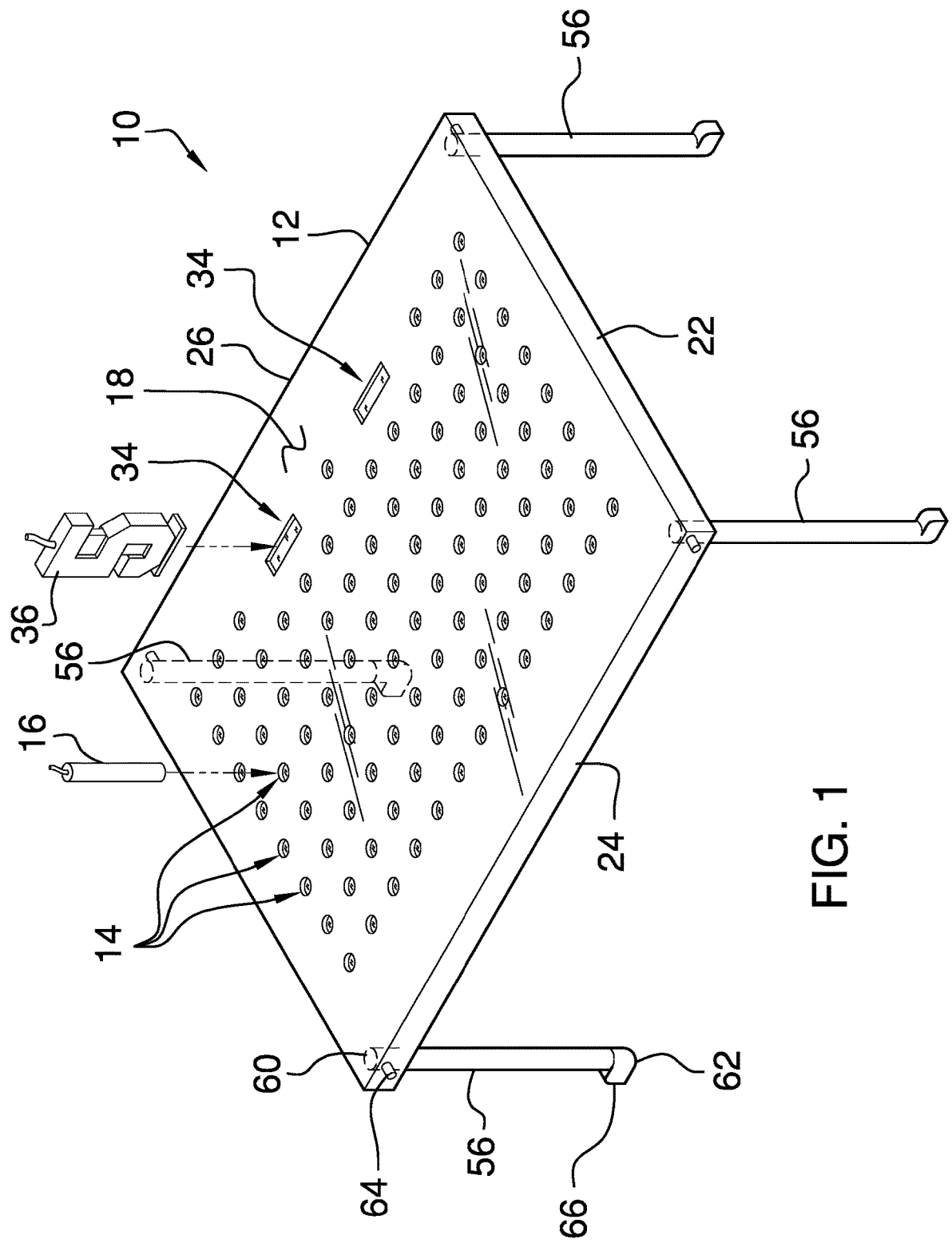
FIG. 1 is a top perspective view of a birthday candle holding assembly according to an embodiment of the disclosure.
Figure 2:
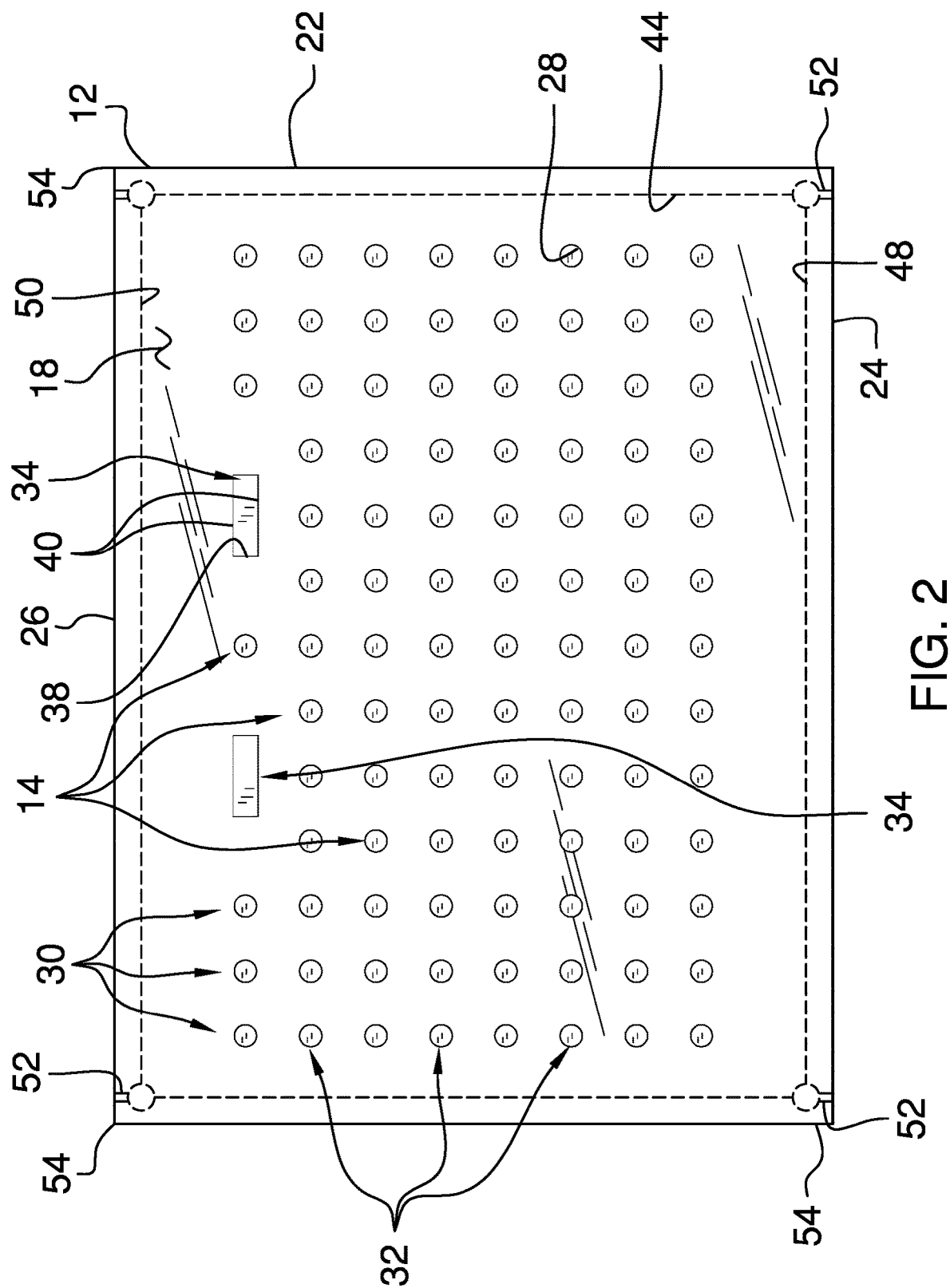
FIG. 2 is a top phantom view of an embodiment of the disclosure.
Figure 3:
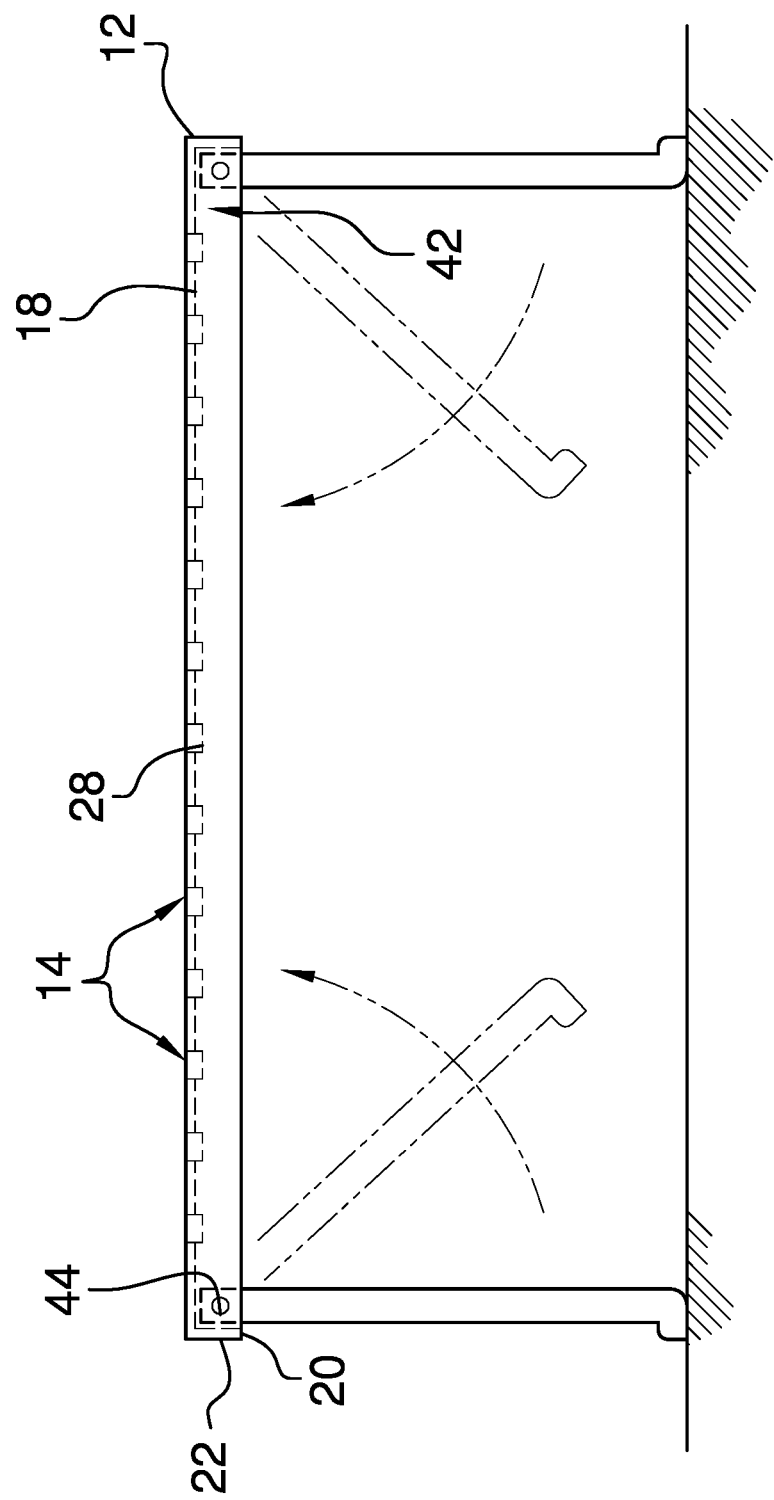
FIG. 3 is a front phantom view of an embodiment of the disclosure.
Figure 4:
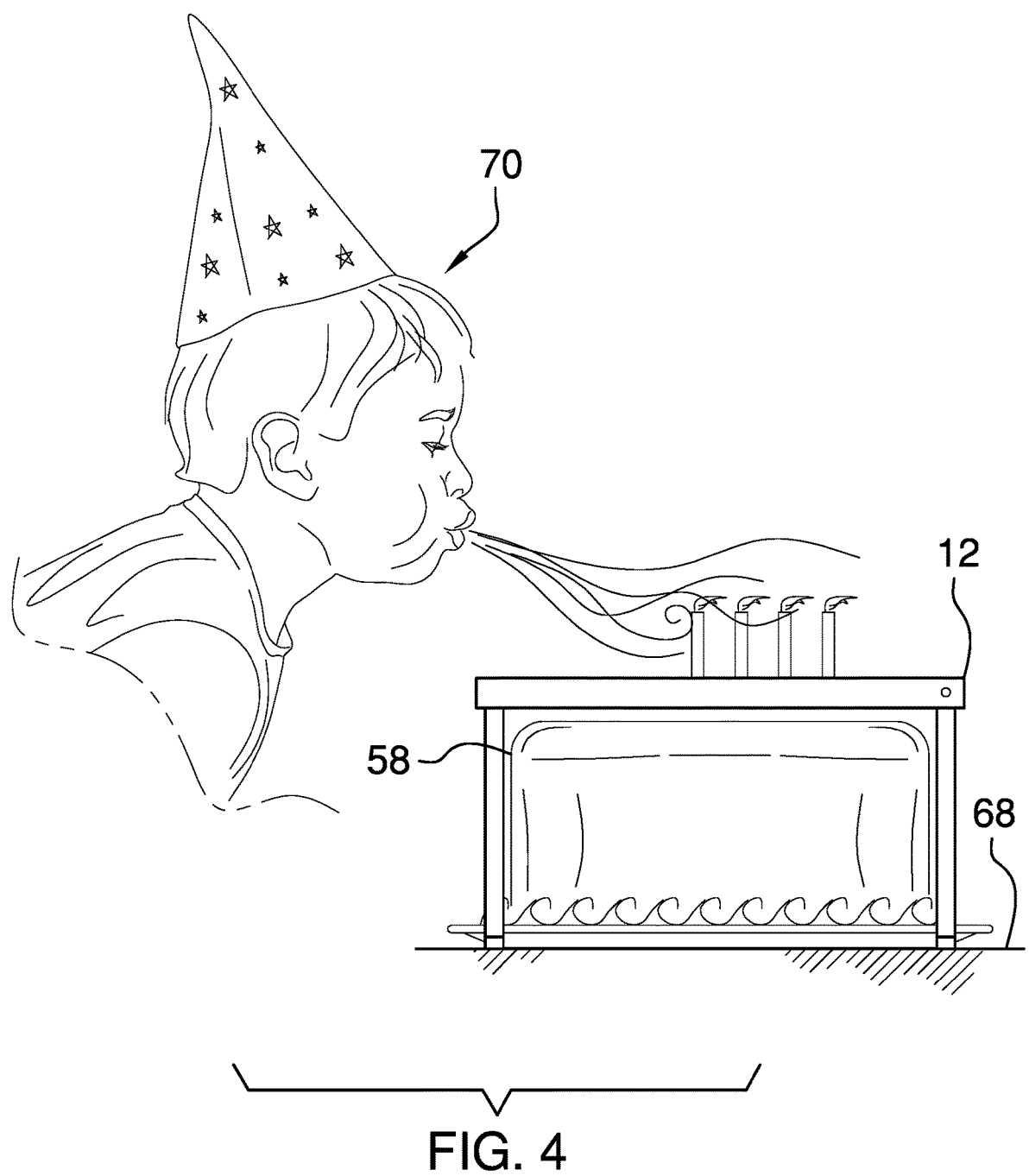
FIG. 4 is a perspective in-use view of an embodiment of the disclosure.

With reference now to the drawings, and in particular to FIGS. 1 through 4 thereof, a new birthday candle device embodying the principles and concepts of an embodiment of the disclosure and generally designated by the reference numeral 10 will be described.

As best illustrated in FIGS. 1 through 4, the birthday candle holding assembly 10 generally comprises a panel 12 having a plurality of first wells 14. Each of the first wells 14 is integrated into the panel 12 such that each of the first wells 14 is facilitated to insertably receive a birthday candle 16. Each of the first wells 14 has a circular shape thereby facilitating the first wells 14 to receive cylindrical birthday candles. The panel 12 is comprised of a translucent material, such as plastic or the like, thereby facilitating the panel 12 to be seen through by an observer. The panel 12 has a top surface 18, a bottom surface 20 and an outer edge 22 extending between the top surface 18 and the bottom surface 20, and the outer edge 22 has a front side 24 and a back side 26.

Each of the first wells 14 extends downwardly into the top surface 18 toward the bottom surface 20. Each of the first wells 14 has a bounding surface 28 that is continuously arcuate about a center of the first wells 14 such that each of the first wells 14 has a cylindrical shape. In this way the bounding surface 28 of each of the first wells 14 can conform to the shape of the birthday candles 16 thereby orienting the birthday candles 16 in a vertical orientation. The plurality of first wells 14 is arranged in a plurality of columns 30 and rows 32 on the top surface 18 of the panel 12.

The panel 12 has a plurality of second wells 34. Each of the second wells 34 is integrated into the panel 12 such that each of the second wells 34 is facilitated to insertably receive a birthday candle 16. Furthermore, each of the second wells 34 has a rectilinear shape thereby facilitating the first wells 14 and the second wells 34 to receive letter or number birthday candles 36. Each of the second wells 34 extends downwardly in the top surface 18 of the panel 12 toward the bottom surface 20 of the panel 12. Each of the second wells 34 has a bounding surface 38 and the bounding surface 38 of each of the second wells 34 has a plurality of intersecting sides 40 such that each of the second wells 34 has a rectangular shape. Each of the second wells 34 is positioned in a respective one of the rows 32 of the first wells 14. Additionally, each of the second wells 34 is spaced from the back side 26 of the outer edge 22 and each of the second wells 34 is elongated along an axis that is oriented parallel to the back side 26.

The panel 12 has a recess 42 that is integrated into the bottom surface 20 of the panel 12. The recess 42 has a bounding surface 44 and the bounding surface 44 of the recess 42 has a plurality of intersecting sides 46. Furthermore, the plurality of intersecting sides 46 of the bounding surface 44 of the recess 42 has a forward side 48 and a rearward side 50. Each of the forward side 48 and the rearward side 50 is oriented parallel to a respective one of the front side 24 and the back side 26 of the outer edge 22. Additionally, the panel 12 has a plurality of leg wells 52 each extending through a respective one of the forward side 48 and the rearward side 50 of the bounding surface 44 of the recess 42 toward a respective one of the front side 24 and the back side 26 of the outer edge 22 of the panel 12. Each of the leg wells 52 is positioned adjacent to a respective one of four corners 54 of the outer edge 22 of the panel 12.

A plurality of legs 56 is provided and each of the legs 56 is pivotally disposed on the panel 12. Each of the legs 56 is positionable in a deployed position having the legs 56 extending downwardly from the panel 12. In this way the panel 12 can be positioned over a birthday cake 58 thereby facilitating the panel 12 to support the birthday candles 16 over the birthday cake 58. Thus, the birthday candles 16 do not need to be inserted into the birthday cake 58 thereby preserving the appearance of the birthday cake 58. Each of the legs 56 is positionable in a folded position to facilitate the panel 12 to be positioned in a dishwasher for cleaning the panel 12.

Each of the legs 56 has an upper end 60 and a lower end 62, and each of the legs 56 has a pin 64 that is coupled to and extends laterally away from the legs 56. The pin 64 on each of the legs 56 is positioned adjacent to the upper end 60 of the legs 56. Additionally, the pin 64 on each of the legs 56 extends into a respective one of the leg wells 52 in the bounding surface 44 of the recess 42 for pivotally retaining the legs 56 on the panel 12. Each of the legs 56 includes a foot 66 extending laterally away from the legs 56 and the foot 66 on each of the legs 56 is aligned with the lower end 62 of the legs 56. The panel 12 may have a width ranging between approximately 20.0 cm and 25.0 cm and a length ranging between approximately 25.0 cm and 35.0 cm. Each of the legs 56 may have a height ranging between approximately 10.0 cm and 15.0 cm.

In use, the legs 56 are positioned in the deployed position and legs 56 are stood on a support surface 68, such as a table for example, such that the panel 12 is supported over the birthday cake 58. The birthday candles 16 are inserted into respective first wells 14 in the panel 12, depending on a user's 70 preference for arranging the birthday candles 16. Additionally, number or letter birthday candles 36 can each be inserted into the second wells 34. In this way the birthday candles 16 can be displayed for blowing out without inserting the birthday candles 16 into the birthday cake 58. Thus, the appearance of the birthday cake 58 is preserved and a person celebrating their birthday can enjoy the experience of blowing out the birthday candles 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A birthday candle holding assembly for displaying birthday candles over a birthday cake, said assembly comprising:
 a panel having a plurality of first wells each being integrated into said panel such that each of said first wells is facilitated to insertably receive a birthday candle, each of said first wells having a circular shape thereby facilitating said first wells to receive cylindrical birthday candles, said panel having a plurality of second wells each being integrated into said panel such that each of said second wells is facilitated to insertably receive a birthday candle, each of said second wells having a rectilinear shape thereby facilitating said first wells and said second wells to receive letter or number birthday candles;
 a plurality of legs, each of said legs being pivotally disposed on said panel, each of said legs being positionable in a deployed position having said legs extending downwardly from said panel wherein said panel is configured to be positioned over a birthday cake thereby facilitating said panel to support the birthday candles over the birthday cake, each of said legs being positionable in a folded position wherein said legs are configured to facilitate said panel to be positioned in a dishwasher for cleaning said panel;

wherein said panel has a top surface, a bottom surface and an outer edge extending between said top surface and said bottom surface, said outer edge having a front side and a back side;

wherein said panel has a recess being integrated into said bottom surface of said panel, said recess having a bounding surface, said bounding surface of said recess having a plurality of intersecting sides, said plurality of intersecting sides of said bounding surface of said recess having a forward side and a rearward side, each of said forward side and said rearward side being oriented parallel to a respective one of said front side and said back side of said outer edge; and wherein said panel has a plurality of leg wells each extending through a respective one of said forward side and said rearward side of bounding surface of said recess toward a respective one of said front side and said back side of said outer edge of said panel, each of said leg wells being positioned adjacent to a respective one of four corners of said outer edge of said panel.

2. The assembly according to claim 1, wherein said panel has a top surface, a bottom surface and an outer edge extending between said top surface and said bottom surface, each of said first wells extending downwardly into said top surface toward said bottom surface, each of said first wells having a bounding surface being continuously arcuate about a center of said first wells such that each of said first wells has a cylindrical shape thereby facilitating said bounding surface of each of said first wells to conform to the shape of the birthday candles thereby orienting the birthday candles in a vertical orientation, said plurality of first wells being arranged in a plurality of columns and rows on said top surface of said panel.

3. The assembly according to claim 2, wherein:
said outer edge of said panel has a front side and a back side; and
each of said second wells extends downwardly in said top surface of said panel toward said bottom surface of said panel, each of said second wells having a bounding surface, said bounding surface of each of said second wells having a plurality of intersecting sides such that each of said second wells has a rectangular shape, each of said second wells being positioned in a respective one of said rows of said first wells, each of said second wells being spaced from said back side of said outer edge, each of said second wells being elongated along an axis being oriented parallel to said back side.

4. The assembly according to claim 1, wherein:
each of said legs has an upper end and a lower end;
each of said legs has a pin being coupled to and extending laterally away from said legs, said pin on each of said legs being positioned adjacent to said upper end of said legs, said pin on each of said legs extending into a respective one of said leg wells in said bounding surface of said recess for pivotally retaining said legs on said panel; and
each of said legs includes a foot extending laterally away from said legs, said foot on each of said legs being aligned with said lower end of said legs.

5. A birthday candle holding assembly for displaying birthday candles over a birthday cake, said assembly comprising:
a panel having a plurality of first wells each being integrated into said panel such that each of said first wells is facilitated to insertably receive a birthday candle, each of said first wells having a circular shape thereby facilitating said first wells to receive cylindrical birthday candles, said panel having a top surface, a bottom surface and an outer edge extending between said top surface and said bottom surface, said outer edge having a front side and a back side, each of said first wells extending downwardly into said top surface toward said bottom surface, each of said first wells having a bounding surface being continuously arcuate about a center of said first wells such that each of said first wells has a cylindrical shape thereby facilitating said bounding surface of each of said first wells to conform to the shape of the birthday candles thereby orienting the birthday candles in a vertical orientation, said plurality of first wells being arranged in a plurality of columns and rows on said top surface of said panel, said panel having a plurality of second wells each being integrated into said panel such that each of said second wells is facilitated to insertably receive a birthday candle, each of said second wells having a rectilinear shape thereby facilitating said first wells and said second wells to receive letter or number birthday candles, each of said second wells extending downwardly in said top surface of said panel toward said bottom surface of said panel, each of said second wells having a bounding surface, said bounding surface of each of said second wells having a plurality of intersecting sides such that each of said second wells has a rectangular shape, each of said second wells being positioned in a respective one of said rows of said first wells, each of said second wells being spaced from said back side of said outer edge, each of said second wells being elongated along an axis being oriented parallel to said back side, said panel having a recess being integrated into said bottom surface of said panel, said recess having a bounding surface, said bounding surface of said recess having a plurality of intersecting sides, said plurality of intersecting sides of said bounding surface of said recess having a forward side and a rearward side, each of said forward side and said rearward side being oriented parallel to a respective one of said front side and said back side of said outer edge, said panel having a plurality of leg wells each extending through a respective one of said forward side and said rearward side of bounding surface of said recess toward a respective one of said front side and said back side of said outer edge of said panel, each of said leg wells being positioned adjacent to a respective one of four corners of said outer edge of said panel; and
a plurality of legs, each of said legs being pivotally disposed on said panel, each of said legs being positionable in a deployed position having said legs extending downwardly from said panel wherein said panel is configured to be positioned over a birthday cake thereby facilitating said panel to support the birthday candles over the birthday cake, each of said legs being positionable in a folded position wherein said legs are configured to facilitate said panel to be positioned in a dishwasher for cleaning said panel, each of said legs having an upper end and a lower end, each of said legs having a pin being coupled to and extending laterally away from said legs, said pin on each of said legs being positioned adjacent to said upper end of said legs, said pin on each of said legs extending into a respective one of said leg wells in said bounding surface of said recess for pivotally retaining said legs on said panel, each of said legs including a foot extending laterally away from said legs, said foot on each of said legs being aligned with said lower end of said legs.

* * * * *